United States Patent [19]

Lee

[11] Patent Number: 4,882,524

[45] Date of Patent: Nov. 21, 1989

[54] MULTI-PHASE BIPOLAR BRUSHLESS D.C. MOTOR

[76] Inventor: I Soo Lee, JangMi Apt. 9/B, 302-64, Ichon-Dong, YongSan-Ku, Seoul, Rep. of Korea

[21] Appl. No.: 180,373

[22] Filed: Apr. 12, 1988

[30] Foreign Application Priority Data

Apr. 22, 1987 [KR] Rep. of Korea ................ 87-3937[U]

[51] Int. Cl.$^4$ ............................................. H02K 29/10
[52] U.S. Cl. ..................................... 318/254; 318/138
[58] Field of Search ............... 318/138, 254, 293, 294, 318/439

[56] References Cited

U.S. PATENT DOCUMENTS

| | | | |
|---|---|---|---|
| 4,088,908 | 5/1978 | Gumen et al. .................. | 318/254 X |
| 4,296,362 | 10/1981 | Beasley ........................... | 318/254 X |
| 4,353,016 | 10/1982 | Born ................................ | 318/254 |
| 4,598,240 | 7/1986 | Gale et al. ....................... | 318/254 X |
| 4,638,224 | 1/1987 | Gritter ............................. | 318/138 X |
| 4,678,974 | 7/1987 | Guastadini ...................... | 318/254 |
| 4,730,150 | 3/1988 | Lee et al. ........................ | 318/254 |
| 4,763,051 | 8/1988 | Ruppert .......................... | 318/254 |

FOREIGN PATENT DOCUMENTS

| | | | |
|---|---|---|---|
| 58-215989 | 12/1983 | Japan .................................. | 318/254 |
| 60-141184 | 7/1985 | Japan .................................. | 318/254 |
| 2102222 | 1/1983 | United Kingdom ................. | 318/254 |

Primary Examiner—Bentsu Ro

[57] ABSTRACT

In a multi-phase bipolar brushless D.C. motor in which the permanent magnet instead of the field coil is used for the rotor, the armature is used for the stator. The winding is wound on the stator as the independent phase-connected winding, the commutation encoder is fixedly mounted on the shaft of the rotor to be rotated, and the photo-sensor is coupled operatively thereto to be connected with the driving circuit, thereby the motor is smoothly started and rotated with a simple construction, and is manufactured at low cost.

5 Claims, 10 Drawing Sheets

MULTI-PHASE BIPOLAR BRUSHLESS D.C. MOTOR

BACKGROUND OF THE INVENTION

1. Field of the Invention

The present invention relates to a multi-phase bipolar brushless D.C. motor in which a stator is constituted by an armature and a rotor is constituted by permanent magnets.

If in this motor the stator winding is arranged as the lap winding, the motor produces the sinusoidal torque ripples thereby to be adapted for the micro-motor, and instead if the stator winding is arranged as the wave winding, the motor produces the trapezoidal torque ripples thereby to be adapted for the power motor.

And this invention is devised to make into the bipolar system so that the copper loss of the exciting coil can be minimized, thereby increasing the efficiency, and to make into polyphase so that the utility of the coil can be increased, thereby making the compact design of the motor possible and improving the torque ripple. Also in this motor the commutation system comprising a commutation encoder, a photo-sensor and a electronic commutator is simply and safely constituted so that the starting and rotation characteristics of the motor can be improved as well as the motor having the simple construction can be manufactured, thereby reducing the cost of production.

2. Description of the Prior Art

In a conventional shunt motor, since the field coils (exciting coils) are wound on the rotor to have the proper number of poles and the coils attaching the brushes thereto are wound on the rotor so that the rotor is rotated, there are drawbacks that, during its use, the alien substances such as dusts are jammed between the commutator segments or the brush must be replaced with the new one due to the contact therebetween by breakdown of insulation or the wear thereof.

SUMMARY OF THE INVENTION

An object of the present invention is, in order to solve the aforementioned problems, to provide a multi-phase bipolar brushless D.C. motor in which the permanent magnet instead of the field coil is used for the rotor, the winding is wound on the stator as the independent winding, the commutation encoder is fixedly mounted on the shaft of the rotor to be rotated, and the photo-sensor is coupled operatively thereto to be connected with the driving circuit, whereby the motor is smoothly started and rotated with having a simple construction, and is manufactured of low cost of production.

Accordingly, with this object in view, the present invention resides in a multi-phase bipolar brushless D.C. motor comprising: a stator constituted by M phases, each phase having a plurality of windings which are connected in series and being connected independently of the winding connection of the other phases; a rotor rotatably coupled to said stator and having N permanent magnet poles; a commutation encoder fixed at one end of the rotor shaft outside the motor and assuming a cylindrical form comprising a circular plate and an annular ring, said annular ring having light shielding portions and light detecting portions which function, respectively, as the non-sensing and sensing area, and each of said light detecting portions having opposite inclined portions each which is inclined to the edge of said light shielding portions at a given angle; a photo-sensor coupled operatively with said commutation encoder and being constituted so that two photo-transistors are provided with respect to each phase, each of said photo-transistors in said M phases being arranged, in turn, one by one at intervals of predetermined shaft angle so as to produce the positive pulse when registered with said sensing area of said commutation encoder; an electronic commutator constituted in such a manner that four power transistors are connected across the winding coil of each phase of said stator, two of said transistors of each phase being connected to one phototransistor of said photo-sensor so that each phase is provided with two photo-transistors so as to perform the determination of the current direction according to said positive pulse of said photo-transistors, thereby flowing the alternating current through the winding coil to drive the motor; and an electric power source connected in parallel to each phase of said electronic commutator.

BRIEF DESCRIPTION OF THE DRAWINGS

The invention may be better understood, and further advantages and use thereof more readily apparent, when considered in view of the following detailed description of exemplary embodiment, taken with the accompanying drawings, in which.

DETAILED DESCRIPTION OF THE PREFERRED EMBODIMENT

Now, a multi-phase brushless D.C. motor according to the present invention will be explained. It should be noted that, for a facile description, the following explanation of the present invention will be made with reference to a 3-phase 4-pole brushless D.C. motor of a preferred embodiment shown, by way of example only, in the accompanying drawings.

Figure 1:
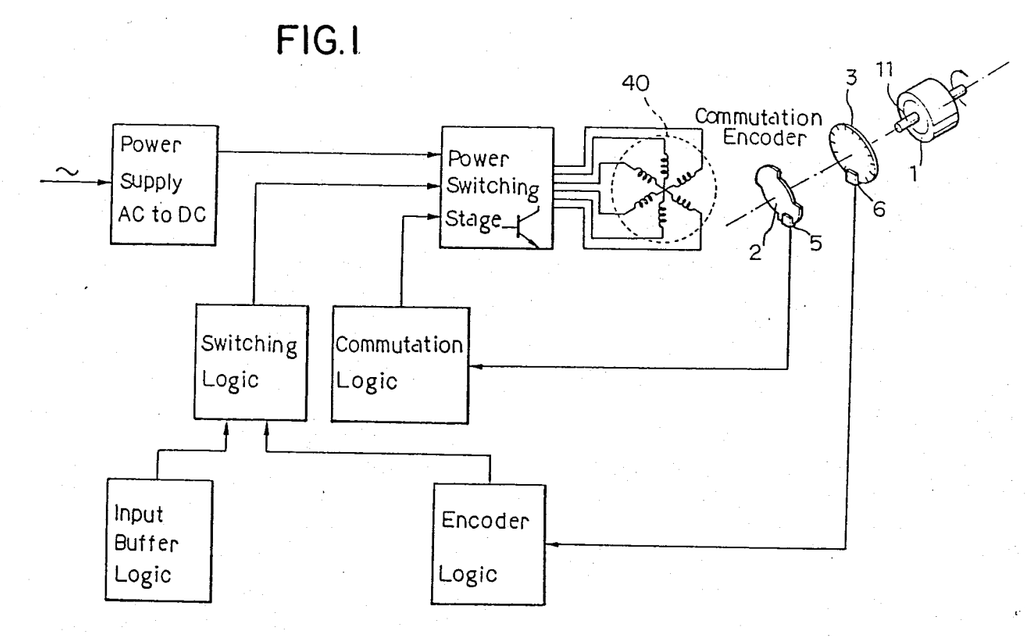
FIG. 1 is a schematic diagram showing, partly in block form, the system of a multi-phase bipolar brushless D.C. motor according to the present invention.
Figure 3A:
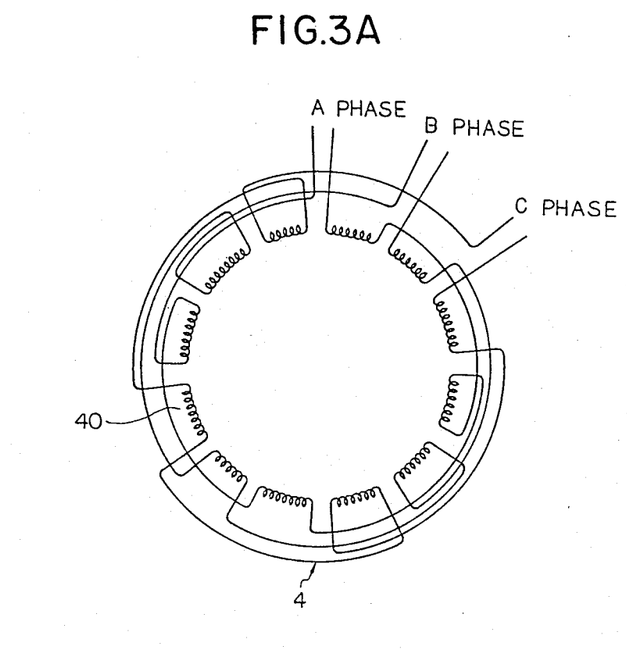
FIG. 3A is a circular independent connecting diagram of the winding coils of the 3-phase 4-pole motor.
Figure 3B:
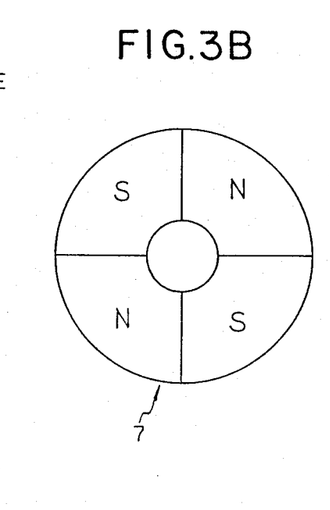
FIG. 3B is an arrangement diagram of the 4-pole rotor.
Figure 3C:
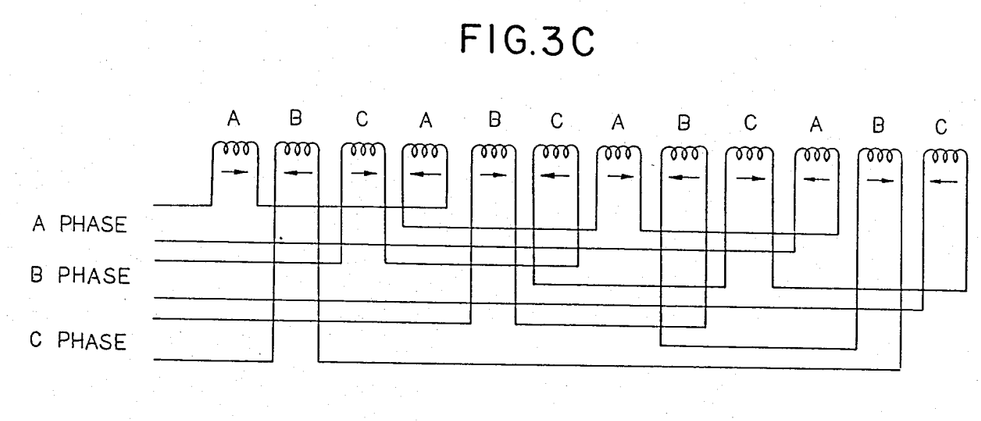
FIG. 3C is a serially developed independent connecting diagram of the winding coils of the 3-phase 4-pole motor.

Referring now to the several drawings, and especially to FIG. 1, there is illustrated the system of the 3-phase 4-pole brushless D.C. motor according to the preent invention, in block form. The 3-phase 4-pole brushless D.C. motor of the present invention includes a rotary machine 1 having a stator 4 constituted by three phases A, B and C, each phase having four windings 40 which are connected in series (see FIG. 3A). Windings 40 of each phase of the stator 4 are connected independently of the winding connection of the other phases, as can be understood from FIG. 3A and 3C, respectively, illustrating a circular independent connecting diagram and a serially developed independent connecting diagram of the winding coils of the 3-phase 4-pole motor according to the present invention. The winding coil ends of each phase of the stator 4 are connected to transistors of each corresponding phase of a electronic commutator, as will be described. Thus, since the stator 4 assumes the independent phase-connected winding form connected differently from the Δ-, or Y-connected winding form, the motor is constituted so that the exciting condition of the winding coil of each phase is always constant, even though the motor becomes of the polyphase motor. The rotary machine 1 also has a rotor 7 constituted by the permanent magnets. The rotor 7 is constituted as four magnetic poles, as shown in FIG. 3B. It is understood that the stator 4 can be constituted as two, three, four, five,... or n phase, and the rotor 7 can be constituted as two, four, six, eight,... or 2n poles. Hence, the number of poles or phases can be easily increased, or reduced as occasion demands, and the length, the thicknes, or the shape of the rotary machine 1 can be easily modified as occasion demands.

Figures 2A, 2B:
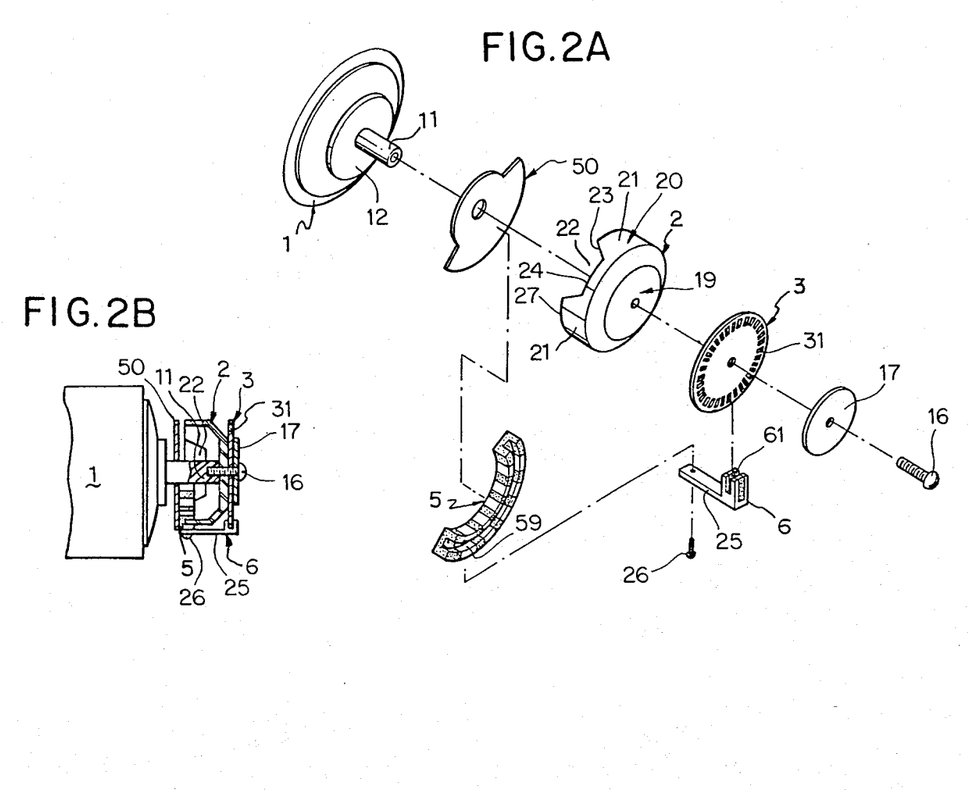
FIG. 2A is a exploded perspective view showing the speed encoder, the speed sensor, the commutation encoder, and the photo-sensor according to the present invention.
FIG. 2B is a party sectional view showing the state in which the components in FIG. 2A are combined together.

As shown in FIG. 2, a rotor shaft 11 of the rotary machine 1 is projected outwardly from a bracket 12 which is fixed on the one side of the rotary machine 1. Fixed on the end of the rotor shaft 11 are a commutation encoder 2 and a speed encoder 3. Since the commutation encoder 2 and the speed encoder 3 are fixed between the end of the rotor shaft 11 and a washer 17 by means of screw means 16, the commutation encoder 2 and the speed encoder 3 can be rotated together with the rotor shaft 11.

The speed encoder 3, as can be understood from FIG. 2A, assumes the disk form which a plurality of light penetrating openings 31 are spaced and disposed at the circumferential edge portion thereof so as to position with respect to a speed sensor 6. The speed sensor 6 at the support portion 25 thereof is fixed to a portion of a photo-sensor 5 by means of screw means 26. When the speed encoder 3 is rotated, the speed sensor 6 detects a pulse corresponding to the rotation speed of the rotor 7 through the light penetrating openings 31. The detected pulse is supplied to the switching circuit through the encoder circuit so as to control the electric power energy supplied to the winding coils, thereby controlling the rotation speed of the rotor 7, as known in the art.

The commutation encoder 2, as can be understood from FIG. 2B, assumes the cylindrical from having a circular plate 19 and an annular ring 20. The annular ring 20 comprises light shielding portions 21 and light detecting portions 22 which function as the non-sensing area and the sensing area for the photo-sensor 5, respectively. It will be noted that in FIG. 1, 5, 7, 8 and 11 the commutation encoder 2 is illustrated in a developed form for a facile illustration. Each of light detecting portions 22 has opposite inclined portions 23 so as to modulate the exciting width by adjusting of the distance between the photo-sensor 5 and the commutation encoder 2, as will be described with reference to FIG. 8. Each of the inclined portions 23 are inclined to the edge 27 of the light shielding portion 22 at a given angle.

The number of the light detecting portions 22, i.e., the sensing areas is determined by the following formula;

The number of the sensing areas = the number of poles in the rotor/2.

Accordingly, the number of the sensing areas of the preferred 3-phase 4-pole motor corresponds to two. Also, the width of the sensing area corresponds to the shaft angle determined by the following formula;

$$\text{The width of the sensing area} = \frac{2\pi}{\text{the number of poles in the rotor}} \times \frac{\text{the number of phases} - 1}{\text{the number of phases}} \text{ (degrees)}$$

Figure 5A:
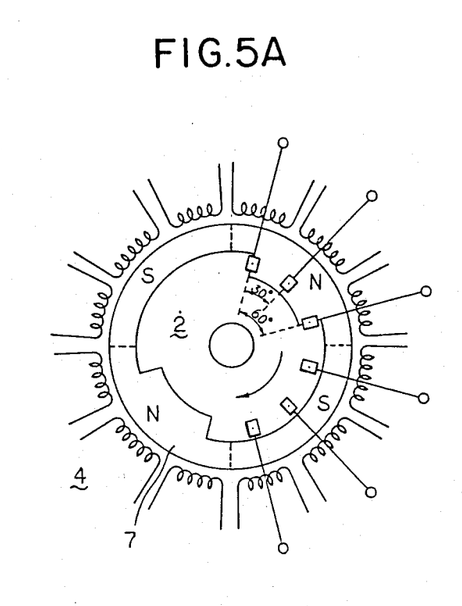
FIG. 5A represents a schematic construction of the 3-phase 4-pole motor.

Hence, the width of the sensing area of the preferred 3-phase 4-pole motor corresponds to the shaft angle of 60°, as shown in FIG. 5A. In the case of the 4-phase 4-pole motor, as shown by way of another example in FIG. 5B, the width of the sensing area corresponds to the shaft angle of 67.5°.

Figure 10A:
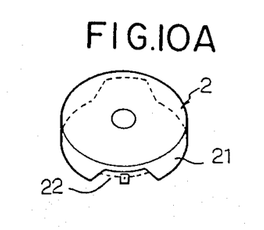
FIG. 10A and 10B represent respectively the state where the photo-transistor is attached to the optimally corrected position on the commutation encoder and the waveform of torque ripple.
Figure 10B:
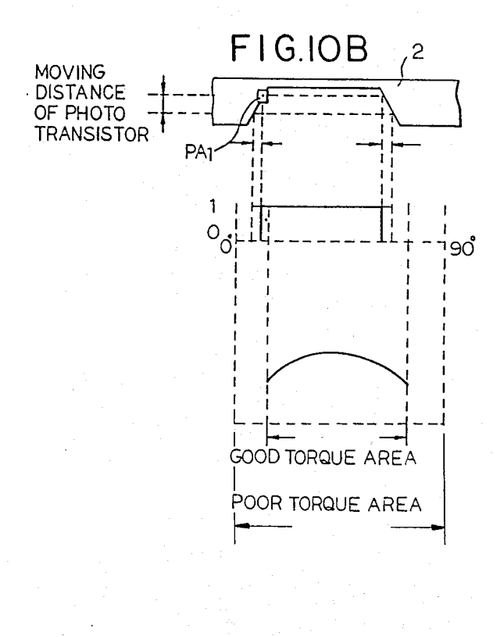

However, thus determined, the width of the sensing area for the photo-sensor 5 can be slightly changed to modulate the exciting width in the winding coil, if necessary. For example, in case that photo-transistors (only one shown in FIG. 9) of the photo-sensor 5, as will be described, are positioned in the position which the sensing area therefor corresponds to the shaft angle of 60°, the winding coil will result in the exciting in the area of poor torque because the exciting width of the winding coil is not coincided with the pulse width induced from the photo-transistor, i.e., the exciting width of the winding coil is naturally greater than the pulse width of the photo-transistor due to the time delaying of driving circuit and the exciting characteristic of the winding coil. The exciting in the area of poor torque makes the copper loss of the winding coil increased, which results in generating heat in the motor, and degrating the efficiency. To eliminate these drawbacks, it is necessary to change the width of the sensing area for the photo-transistor having an effect on the exciting width in the winding coil. This is accomplished by adjusting the distance between the sensing point of the photo-transistors and the middle portion 24 of the light detecting portion 22 because the light detecting portion 22 of the commutation encoder 2 has opposite inclined portions 23. This adjustment can be easily performed because the commutation encoder 2 and the photo-sensor 5 are disposed on the rotor shaft 11 outside the rotary machine 1. At this time, it is preferred for the adjustment of the distance between the photo-transistors and the commutation encoder 2 to set in the best position of torque ripple and in the most efficient position of the motor in operation. When the photo-transistor is positioned in the position displaced by the moving distance of photo-transistor as illustrated in FIG. 10, the winding coil will result in the exciting in the area of good torque. Thus, the commutation encoder 2 of the invention makes it possible to maximize the efficiency of the motor by adjusting the distance between the photo-sensor 5 and the commutation encoder 2.

Disposed on the rotor shaft 11 between the bracket 12 and the commutation encoder 2 so as not to rotate together with the rotor shaft 11, as shown in FIG. 2, is a semicircular support plate 50 for supporting the photo-sensor 5 for producing the positive pulse when registered with the sinsing area of the commutation encoder 2. The photo-sensor 5 assumes a U-shaped form having a guide groove 59 for receiving and guiding the annular ring 20 of the commutation encoder 2. As shown in FIG. 4B and 5, the photo-sensor 4 is constituted by six photo-transistors $PA_1$, $PB_1$, $PC_1$, $PA_2$, $PB_2$ and $PC_2$ so that two photo-transistors are provided with respect to each phase. Each of photo-transistors $PA_1$, $PB_1$, $PC_1 PA_2$, $PB_2$ and $PC_2$ in A-, B-, and C-phase is arranged, in turn, one by one at intervals of the shaft angle calculated by the following formula;

The interval between each of photo-transistors =

$$\frac{2\pi}{\text{the number of poles in the rotor}} \times \frac{1}{\text{the number of phases}} \text{ (degrees)}$$

Accordingly, the interval between each photo-transistors of the preferred 3-phase 4-pole motor corresponds to the shaft angle of 30°.

The interval between two photo-transistors of each phase is determined by the following formula;

The interval between two photo-transistors of each phase =

$$\frac{2\pi}{\text{the number of poles in the rotor}} \text{ (degrees)}$$

Therefore, the interval between two photo-transistors $PA_1$ and $PA_2$ of A-phase corresponds to the shaft angle of 90°, and also the cases of B- and C-phases are the same as A-phase.

In the case of the 4-phase 4-pole motor as shown in FIG. 5B, the interval between each photo-transistors corresponds to the shaft angle of 22.5°, and the interval between two photo-transistors of each phase corresponds to the shaft angle of 90°.

In the brushless D.C. motor constructed thus, the number of photo-transistors which can be turned on simultaneously within one sensing area corresponds to the number of phases -1. Accordingly, the commutation encoder 2 and photo-transistors according to the present invention becomes of 2-phase 1-exciting, 3-phase 2-exciting, 4-phase 3-exciting, 5-phase 4-exciting, 6-phase 5-exciting,...so that the n-phase (n-1)-exciting motor is construction, thereby performing the production of the multiphase bipolar brushless D.C. motor.

Figure 7A:
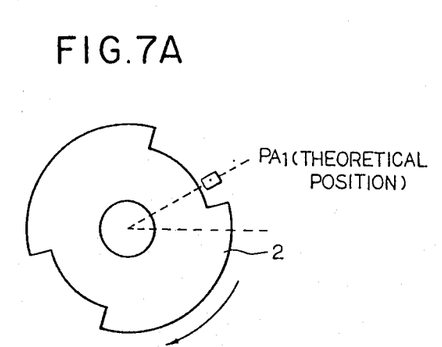
FIG. 7A and 7B represent respectively the theoretical position of the photo-transistor and the waveform of the torque ripple.
Figure 7B:
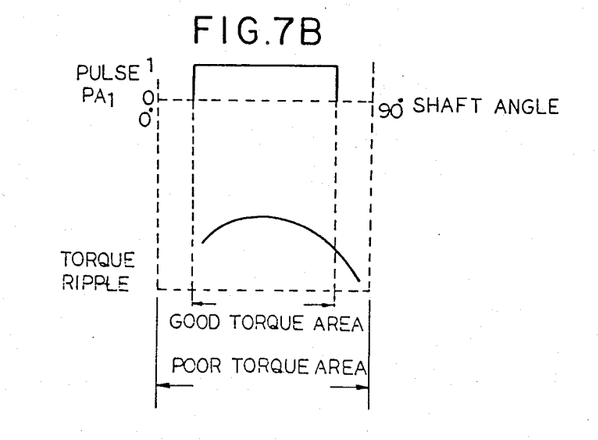
Figure 8A:
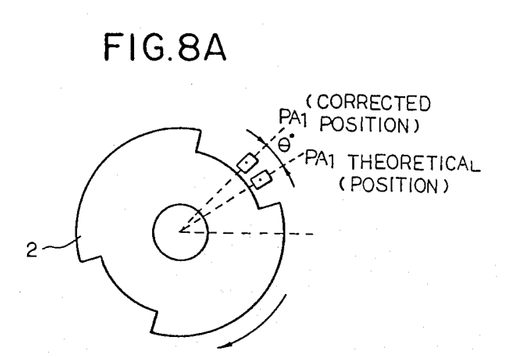
FIG. 8A and 8B represent respectively the corrected position of the photo-transistor and the waveform of the torque ripple.
Figure 8B:
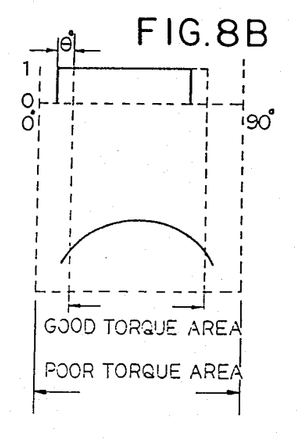
Figures 9A, 9B:
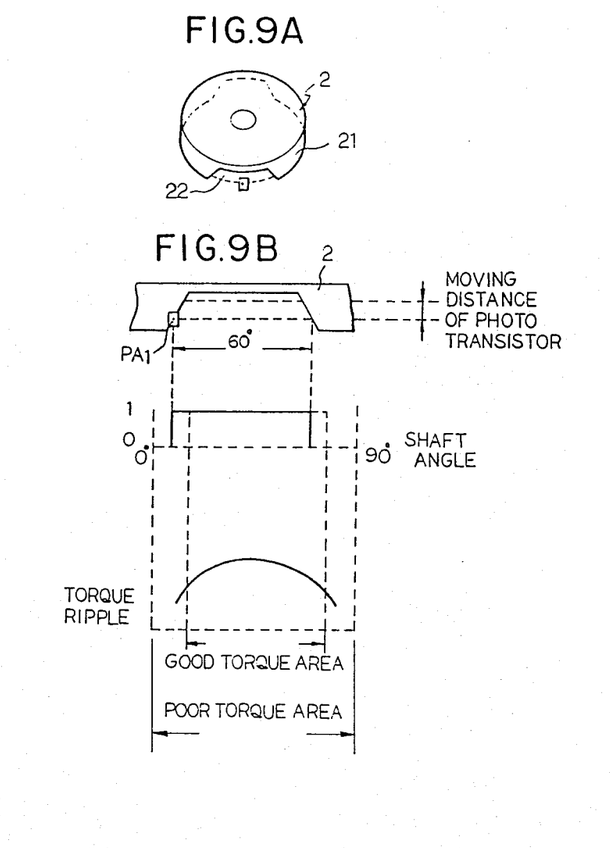
FIG. 9A and 9B represent respectively the photo-transistor being attached at the corrected angle to the commutation encoder and the waveform of torque ripple.

In addition, in order to improve the efficiency and minimize the copper loss, it is preferred for the photo-transistors of the photo-sensor 5 to be set in the advanced commutation by "$\theta$°" as the best position with the motor in driving. This reason are as follows:

As shown in FIG. 7 and 8, if the photo-transistor (only one shown) is registered with the theoretical sensing position of the sensing area of the commutation encoder 2 during the driving of the motor, the photo-transistor will generate a positive pulse so as to be the transistor Q of the electronic commutator "ON", which cause to flow a current in a given direction of the winding coil, as will be described. Then, when the photo-transistor is registered with the non-sensing area of the commutation encoder 2 by the rotation of the commutation encoder 2, the photo-transistor stops the generating of the positive pulse to allow the transistors Q to be turned "OFF", thereby cutting off the current in the winding coil. At this time, the starting and finishing time of exciting in the winding coil shall be delayed by the degree of "$\theta$" as compared with the starting and finishing time of the pulse signal generated from the photo-transistor due to the time delaying of the transistor Q, and the exciting characteristic of the winding coil. This time delaying of the exciting in the winding coil results in the increase of the copper loss and the lowering of efficiency of the motor due to the poor torque, as shown in FIG. 7A. Accordingly, it is necessary to eliminate the portion of poor torque by the advanced commutation of the photo-transistor with the reverse direction to the rotating direction of the rotor 7. This advanced commutation of the photo-transistor of the photo-sensor 5 can be easily adjusted because the photo-transistor is disposed on the rotor shaft 11 outside the rotary machine 1.

Figure 11:
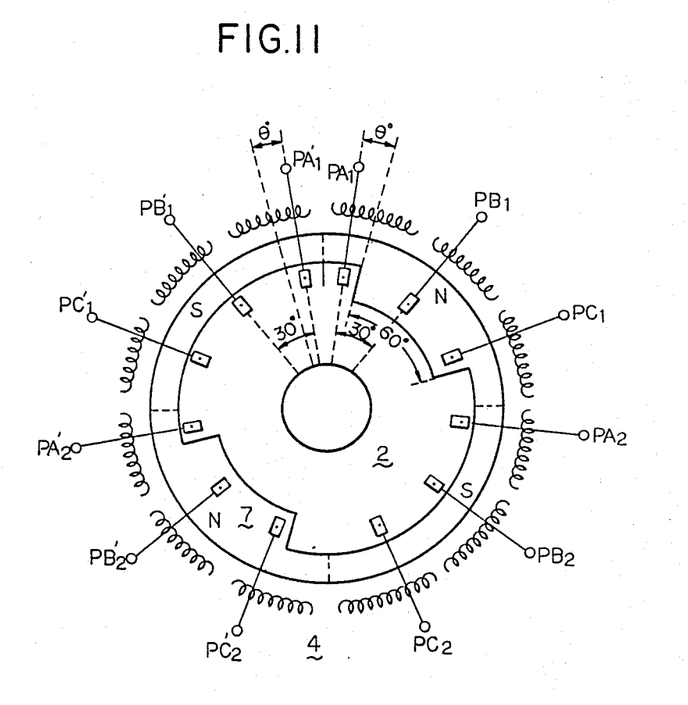
FIG. 11 shows the arrangement of the sets of phototransistor for use in the forward and reverse rotation in the 3-phase 4-pole motor according to the present invention.

Also, the photo-sensor 5 of the 3-phase 4-pole brushless D.C. motor according to the present invention, as shown in FIG. 11, can be constructed to rotate forwardly or reversely by providing the set of photo-transistors $PA'_1 - PC'_2$ for use in the reverse rotation in the symmetric position separated from the set of photo-transistors $PA_1 - PC_2$ for use in the forward rotation advancedly positioned by "$\theta$°" from the theoretical sensing position of photo-transistor. In accordance with the selection of the set of the photo-transistors for use in the forward or reverse rotation by non-contacted electro-magnetic operation, the forward, or reverse rotation of the motor is possible.

Figure 4A:
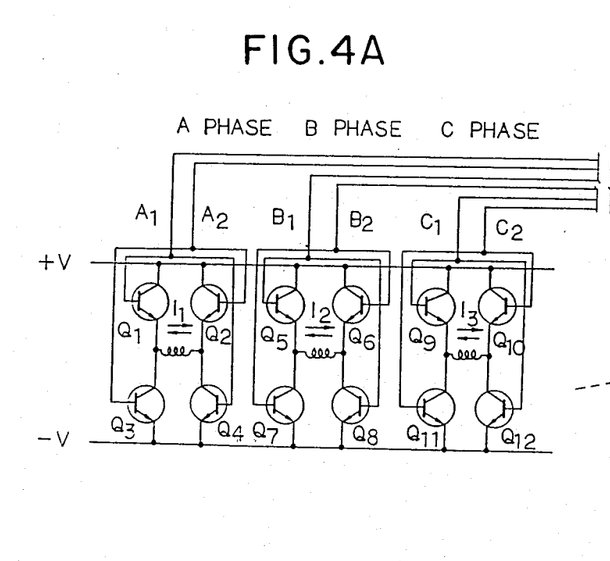
FIG. 4A represents schematically the driving circuit of the 3-phase motor.
Figure 4B:
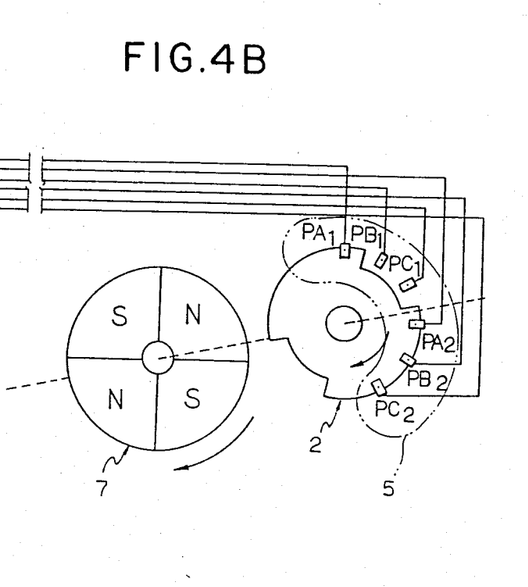
FIG. 4B represents the constructions of the rotor, the connutation encoder and the photo-sensor.
Figure 5B:
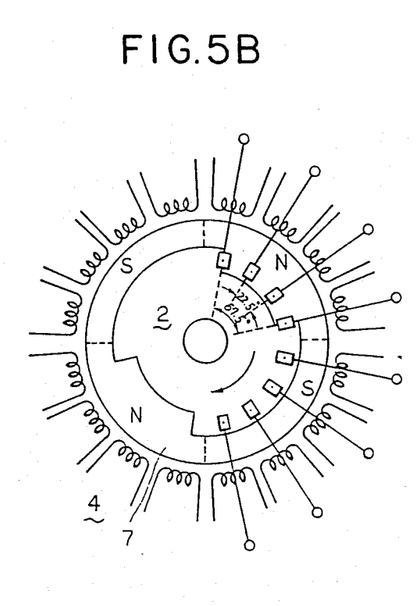
FIG. 5B represents a schematic construction of the 4-phase 4-pole motor.

Referring now to FIG. 4A and 4B, there is illustrated the driving circuit having the commutation system comprising the commutation encoder 2, the photo-sensor 5, and the electronic commutator in accordance with the present invention. The electronic commutator is constituted in such a manner that 4 power transistors Q are connected across the winding coil of each phase of the stator 4. Two of transistors Q connected across the winding coil of each phase are connected to one photo-transistor of the photo-sensor 5 so that each phase is provided with two photo-transistors, thereby performing the determination of the current direction according to the operation of the photo-transistors. Namely, one photo-transistor $PA_1$ of A-phase of the photo-sensor 5 is connected to the transistors $Q_1$ and $Q_4$ so that, when the photo-transistor $PA_1$ is turned on, the transistors $Q_1$ and $Q_4$ are turned on to allow the current to be flowed from the transistor $Q_1$ to the transistor $Q_4$. The other photo-transistor $PA_2$ of A-phase is connected to the transistor $Q_2$ and $Q_3$ so that, when the photo-transistor $PA_2$ is turned on, the transistors $Q_2$ and $Q_3$ are turned on to allow the current to be flow from the transistor $Q_2$ to the transistor $Q_3$. The photo-transistors in B- and C-phase are connected to the transistors in the same way as the photo-transistors in A-phase.

Thus, the commutation system of the present invention is independently arranged in every phase. Accordingly, as two photo-transistors are provided with respect to one phase so that only the positive pulse in used, the pulse dividing device can be removed, and since also each photo-transistor of one phase is constituted so that it is turned off while the rotor is rotated by the shaft angle of 30° upon alternating, the cross-fire prevention interlock can be removed. Hence, since the complicated logic circuit is removed, the safe and simple electronic commutator can be constructed.

Also, as illustrated in FIG. 1, the commutation system of each phase is connected in parallel to one voltage controller, directly in case of D.C. and through D.C. rectifier in case of A.C. so that the motor is composed efficiently.

The operation of the preferred 3-phase 4-pole brushless D.C. motor according to the present invention will now be described.

At first, the switch (not shown) of the power source is turned on to energize the commutation system of the drive circuit.

Figure 6:
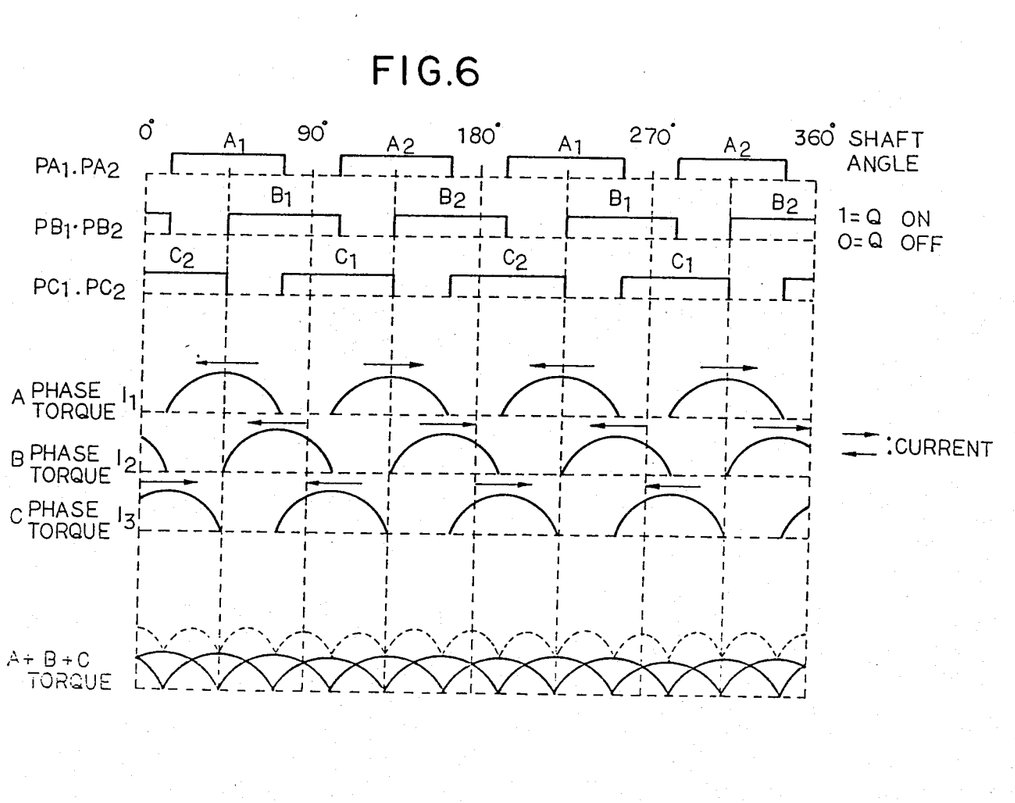
FIG. 6 shows waveform of the output torque ripples of FIG. 3A, 3B and 3C.

So, each of photo-transistors $PA_1$, $PB_1$, $PC_1$, $PA_2$, $PB_2$ and $PC_2$ of the photo-sensor 5 which is registered with one sensing area of the commutation encoder 2 produces the positioning pulse, and supplies the produced positive pulse to the electronic commutator to allow the transistors $Q_1-Q_{12}$ of the electronic commutator to be turned on, thereby allowing the alternating current of the square wave to be flowed through the winding coil of each phase as shown in FIG. 6. Namely, when the photo-transistors $PA_1$ and $PB_1$ of A- and B-phases are within the sensing area of the commutation encoder 2, both the photo-transistors $PA_1$ and $PB_1$ produce the positive pulse. Then, the transistors $Q_1$ and $Q_4$, and $Q_5$ $Q_8$ in A- and B-phases are turned on so that the current of each phase flows, respectively, from the transistor $Q_1$ to $Q_4$ and from the transistor $Q_5$ to $Q_8$ so as to allow the corresponding alternating current of the square wave to be flowed through the winding coil of A- and B-phases, thereby driving the motor. In this case, since the width of the sensing area for the photo-transistor producing the positive pulse to transmit to the electronic commutator corresponds to the shaft angle of 60°, the photo-transistor $PC_1$, $PC_2$, and $PA_2$ and $PB_2$ spaced respectively by the shaft angle of 90° away from the photo-transistor $PA_1$ and $PB_2$ are turned off. While the rotor 7 is rotated by the shaft angle of 30° upon alternating, the photo-transistor $PA_1$ is turned off, as shown in FIG. 4B. Then, the photo-transistor $PC_1$ is newly positioned in the sensing area of the commutation encoder 2 to produce the positive pulse. Accordingly, the transistors $Q_5$ and $Q_8$, and $Q_9$ and $Q_{12}$ in B- and C- phases are maintained in a state turned on so that the current of each phase flows, respectively, from the transistor $Q_5$ to $Q_8$ and from the transistor $Q_9$ to $Q_{12}$ so as to allow the corresponding alternating current of the square wave to be flowed through the winding coil of B- and C-phases, thereby driving the motor. In this case, the photo-transistors $PA_1$, $PA_2$, $PB_2$ and $PC_2$ are turned off, by reason as above-mentioned. While the rotor 7 is again rotated by the shaft angle of 30° upon the alternating, the photo-transistor $PB_1$ is turned off. Then, the photo-transistor $PA_2$ is newly positioned in the sensing area of the commutation encoder 2 to produce the positive pulse. Accordingly, the transistors $Q_9$ and $Q_{12}$, and $Q_2$ and $Q_3$ in C- and A-phases are maintained in a state turned on so that the current of each phase flows, respectively, from the transistor $Q_9$ to $Q_{12}$ and transistor $Q_2$ to $Q_3$ so as to allow the corresponding alternating current of the square wave to be flowed through the winding coil of C- and A-phases, thereby driving the motor. In this case, the photo-transistor $PA_1$, $PB_1$, $PB_2$ and $PC_2$ are at the position where it can not be turned on, by reason as above-mentioned. Thus, the operation of the photo-sensor 5 and electronic commutator of the commutation system is repeated to drive the motor.

On the other hand, as the speed encoder 3 is rotated by the rotor shaft 11 of the rotary machine 1, the speed sensor 6 detects the pulse from the speed encoder 3. The detected pulse signal is supplied to the switching circuit through the encoder circuit so as to controll the electric power energy supplied to the winding coil, thereby controlling the rotation speed of the rotor 7, as known in the art. Accordingly, the brushless D.C. motor according to the present invention can be smoothly rotated.

From the above description, it will be readily seen that the brushless D.C. motor of this invention is constructed so that a pair of photo-transistors per a phas are arranged in the commutation encoder 2 so as to eliminate the signal deviding device and the cross-fire prevention interlock, thereby enabling the circuit to be simplified. Moreover, the brushless D.C. otor of the invention is constituted so that the maximum current can be applied to the independent winding coil for each phase, and the winding coils can be utilized efficiently by the multiphasing (for example, 2-phase 1-exciting, 3-phase 2-exciting, 4-phase 3-exciting, 5-phase 4-exciting, 6-phase 5-exciting....)so as to realize a compact design. Furthermore, the brushless D.C. motor of the invention allows a torque ripple to be remarkably improved, and the copper loss to be minimized by eliminating the portion having the poor torque by the advanced commutation of the photo-transistors and the adjustment of the width of the sensing area for the photo-transistor so that the heat generated from the motor is minimized with improving the efficiency. Further, the brushless D.C. motor of the inention can be constructed to rotate forwardly or reversely by providing the set of photo-transistors used during the reverse rotation in the symmetric position separated from the set of photo-transistors used during the forward rotation. Also, the reduction of the captivity of the transistor mounted in the driving edge having independent phase makes the manufacturing cost reduced.

What is claimed is:

1. A multi-phase bipolar brushless D.C. motor comprising:
   a stator constituted by M phases, each phase having a plurality of windings which are connected in series and being connected independently of the winding connection of the other phases;
   a rotor rotatably coupled to said stator and having N permanent magnet poles;
   a commutation encoder fixed at one end of the rotor shaft outside the motor and assuming a cylindrical form comprising a circular plate and an annular ring, said annular ring having light shielding portions and light detecting portions which function, respectively, as non-sensing and sensing area, and each of said light detecting portions having opposite inclined portions, which is inclined to the edge of said light shielding portions at a given angle;

a photo-sensor coupled operatively with said commutation encoder and being constituted so that two photo-transistors are provided with respect to each phase, each of said photo-transistors in said M phases being arranged, inturn, one by one at intervals of predetermined shaft angle so as to produce a positive pulse when registered with said sensing area of said commutation encoder;

an electronic commutator constituted in such a manner that four power transistors are connected across the windings of each phase of said stator, two of siad four power transistors of each phase being connected to one photo-transistor of said photo-sensor so that each phase is provided with two photo-transistors so as to perform the determination of the current direction according to said positive pulse of said photo-transistors, thereby flowing the alternating current through the windings to drive the motor; and an electric power source connected in parallel to each phase of said electronic commutator.

2. A motor according to claim 1, wherein the width of said light detecting portions is determined by the following formula;

$$\frac{2\pi}{\text{the number of poles in the rotor}} \times \frac{\text{the number of phases} - 1}{\text{the number of phases}} \text{ (degrees)}$$

the number of said light detecting portion is determined by the following formula:

$$\frac{\text{the number of poles in the rotor}}{2}$$

and said interval between each of said photo-transistors is determined by the following formula;

$$\frac{2\pi}{\text{the number of poles in the rotor}} \times \frac{1}{\text{the number of phases}} \text{ (degrees)}$$

so that the motor can be composed of one selected from a group consisting of 2-phase with 1-exciting, 3-phase with 2-exciting, 4-phase with 3-exciting...n-phase with (n-1)-exciting, thereby raising the utility of the windings.

3. A motor according to claim 1, wherein said photo-sensor is arranged in a form of advanced commutation by a given angle in the direction adverse to the rotation direction of said commutation encoder from theoretical position so as to eliminate the poor torque, thereby to minimize the copper loss.

4. A motor according to claim 1, wherein said photo-sensor is coupled operatively with said commutation encoder in such a manner that, as occasion demands, the distance therebetween can be adjusted in order to slightly change the width of said sensing area of said light detecting portion, thereby to modulate the exciting width in the windings.

5. A motor according to claim 1, wherein the photo-sensor includes a set of photo-transistors for use in a reverse rotation which is provided in symmetric position separated from the two photo-transistors for use in a forward rotation.

* * * * *